(12) United States Patent
Yamada et al.

(10) Patent No.: US 8,082,409 B2
(45) Date of Patent: Dec. 20, 2011

(54) DATA STORAGE DEVICE AND DATA MANAGEMENT METHOD IN DATA STORAGE DEVICE

(75) Inventors: Shuhji Yamada, Kanagawa (JP); Toshio Kakihara, Kanagawa (JP); Katsuhiro Imoto, Tokyo (JP); Akihiko Mouri, Tokyo (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 367 days.

(21) Appl. No.: 12/380,116

(22) Filed: Feb. 23, 2009

(65) Prior Publication Data
US 2009/0216943 A1 Aug. 27, 2009

(30) Foreign Application Priority Data
Feb. 21, 2008 (JP) ................. 2008-040128

(51) Int. Cl.
*G06F 12/00* (2006.01)

(52) U.S. Cl. ........ 711/162; 711/103; 711/112; 711/161; 711/206

(58) Field of Classification Search ................. None
See application file for complete search history.

(56) References Cited

U.S. PATENT DOCUMENTS

| 5,576,303 | A | 11/1996 | Shibuya et al. |
| 2006/0080501 | A1 | 4/2006 | Auerbach et al. |
| 2006/0161731 | A1 | 7/2006 | Nakatani et al. |

FOREIGN PATENT DOCUMENTS

JP 2005-134125 5/2005

*Primary Examiner* — Shawn X Gu (57) ABSTRACT

In one embodiment, a HDD creates a segment table to associate an address of user data in a flash memory with an LBA in a magnetic disk. The HDD updates the segment table in a DRAM and saves it to the flash memory at a specific timing. The HDD creates journals indicating the update of the segment table and saves it to the flash memory. The latest segment table can be restored using the segment table and the journals in the flash memory.

16 Claims, 9 Drawing Sheets

| PAGE OF FLASH | LBA | LEN | PIN/UNPIN |
|---|---|---|---|

(b)

| TYPE OF JOURNAL | LBA | LEN | SIZE OF PIN/UNPIN |
|---|---|---|---|

DATA STORAGE DEVICE AND DATA MANAGEMENT METHOD IN DATA STORAGE DEVICE

CROSS-REFERENCES TO RELATED APPLICATIONS

The instant nonprovisional patent application claims priority to Japanese Patent Application No. 2008-040128 filed Feb. 21, 2008 and which is incorporated by reference in its entirety herein for all purposes.

BACKGROUND OF THE INVENTION

Data storage devices using various kinds of media, such as optical disks, magneto-optical disks, flexible magnetic disks, and the like have been known in the art. In particular, hard disk drives (HDDs) have been widely used as storage devices of computers and have been one of the indispensable storage devices for current computer systems. Moreover, HDDs have found widespread application to moving image recording/reproducing apparatuses, car navigation systems, cellular phones, and the like in addition to the computers, due to their outstanding characteristics.

A HDD spins a magnetic disk and moves a head slider to a target data sector to access (read or write) the magnetic disk. Therefore, the HDD may consume more electric power compared with a semiconductor memory and may have slower access speed to the magnetic disk than a semiconductor memory. Particularly, spinning up a spindle motor requires more time than other operations. Accordingly, when the HDD starts up or returns from a power saving mode to reduce power consumption, it requires long process time.

In order to overcome this problem, it has been proposed that a flash memory, a kind of non-volatile semiconductor memory, is implemented in a HDD (refer to Japanese Patent Publication No. 2006-114206, for example). Since the flash memory is a semiconductor memory, it has faster access speed and consumes less power than a magnetic disk. Further, since the flash memory is a non-volatile memory, it can keep data in itself even if the HDD is in a powered-off state.

The capacity of a flash memory to be implemented in an HDD is limited in light of the cost, for example. Therefore, the HDD stores specific user data in the flash memory and other user data on a magnetic disk. For example, storing data which are necessary in starting up a host or are to be frequently accessed by the host in the flash memory achieves reduction in time for starting up the host, improvement in performance of the HDD, and reduction in power consumption during a power saving mode which reduces the rpm of the spindle motor.

The host instructs the HDD to write or retrieve data, specifying a logical block address (LBA), which is an address on a magnetic disk. Therefore, it is necessary that the HDD associate the LBA of user data stored in the flash memory with an address in the flash memory. Specifically, the HDD creates a table to correlate the above two kinds of addresses and refers to the table to access the flash memory. Hereinafter, the table is called a segment table.

The segment table is used after powered off and then powered on again. Accordingly, the HDD stores the segment table on a magnetic disk or in a flash memory; the both of them are non-volatile memories. Typically, the segment table is stored in a flash memory. However, since the flash memory requires a delete and a write operations to rewrite data, frequent updates of the segment table cause degradation in performance.

In response, an idea has been proposed that loads the segment table into a RAM and updates the segment table in the RAM. In addition, it creates log data indicating the updated contents of the segment table and saves the log data to a flash memory. An example of the use of the log data in writing data to a recording medium is disclosed in Japanese Patent Publication No. 2005-134125. The saved log data enables the latest segment table to be restored by using the segment table and the log data in a flash memory even if the latest segment table in the RAM has been deleted by a power shutdown.

From the view point of the performance, it may be preferable to reduce the number of times of saving the segment table. As a result, however, the number of entries in the log data to be saved may become greater. A typical technique to restore data by log data saves log data at every write command accompanied by a write-out operation into the flash memory. Therefore, the number of entries in the log data to be saved increases with the number of write-out operations into the flash memory. Besides, the area for saving the log data has a limit. Accordingly, a technique is demanded to reduce the number of entries in the log data indicating an update of the segment table.

In addition, it may be important to consider the process time in saving the log data. In particular, since a NAND flash memory, which is suitable for storing user data, writes data in a unit of page, a process to save the log data associating with a single write command to a NAND flash memory requires almost the same process time as the process for one data sector. Accordingly, a technique is demanded to reduce the process time in saving the log data indicating an update of the segment table.

BRIEF SUMMARY OF THE INVENTION

Embodiments of the present invention help to improve efficiency in saving log data for an HDD equipped with a magnetic disk and a flash memory. According to the embodiment of FIGS. 1 and 2, an HDD 1 creates a segment table to associate an address of user data in a flash memory 25 with an LBA in a magnetic disk 11. The HDD 1 updates the segment table 243 in a DRAM 24 and saves it to the flash memory 25 at a specific timing. The HDD 1 creates journals indicating the update of the segment table 243 and saves it to the flash memory 25. The latest segment table can be restored using the segment table 253 and the journals in the flash memory 25.

DETAILED DESCRIPTION OF THE INVENTION

Embodiments of the present invention relate to data storage devices and data management methods in data storage devices, and more particularly, relate to the saving of log data indicating updates of tables in a data storage device equipped with a disk and a non-volatile semiconductor memory for saving user data.

A data storage device according to an aspect of embodiments of the present invention comprises a disk memory area for storing user data, a non-volatile semiconductor memory area for storing user data, a volatile memory area for storing a segment table in which the address in the disk memory area of user data stored in the non-volatile semiconductor memory area is registered, a first non-volatile memory area in which the segment table is saved, a second non-volatile memory area in which log data indicating update history of the segment table in the volatile memory area, and a controller. The controller creates log data associated with a plurality of write commands to a continuous address area in the disk memory area while omitting a part of log data associated with each of the plurality of write commands, and saves the created log data associated with the plurality of write commands to the second non-volatile memory area. Thereby, efficient saving of log data is achieved.

The first non-volatile memory area, the second non-volatile memory area, and the non-volatile semiconductor memory area may be provided in the same non-volatile semiconductor memory. Thereby, reduction in the number of components is achieved.

If the plurality of write commands are three or more write commands, the controller omits log data of all the write commands between the first write command and the last write command. Thereby, more efficient saving of log data is achieved.

In one example, log data associated with a single write command includes a prologue before update and an epilogue after update in the segment table in the volatile memory area, and the controller saves a prologue of the first write command and an epilogue of the last write command to the second non-volatile memory area and omits log data between the prologue of the first write command and the epilogue of the last write command. Thereby, more efficient saving of log data is achieved. Moreover, a prologue and an epilogue associated with a single write command each include a start address and an address length specified by the single write command, and the epilogue of the last write command includes a start address included in the prologue of the first write command. Thereby, accurate information can be indicated only by the epilogue.

In one example, the controller processes write commands in the order that the write commands were cached, and if an address specified by a current write command is continuous with an address specified by a preceding write command, adds the current write command to the plurality of write commands. Thereby, a group of plurality of write commands can be formed as needed. The controller may save current log data associated with the plurality of write commands to the second non-volatile memory area, if the number of write commands constituting the plurality of write commands has reached a threshold. Besides, if a length of an address specified by a write command has reached a threshold, the controller saves log data associated with the write command to the second non-volatile memory area independently. Otherwise, if an address area specified by a write command constituting the plurality of write commands has reached a threshold, the controller saves current log data associated with the plurality of write commands to the second non-volatile memory area. These prevent the time until saving the log data from getting too long.

Furthermore, if a power shutdown interrupts saving log data associated with the plurality of write commands, the controller started-up after the power shutdown may delete a non-use area following an address associated with the first write command of the plurality of write commands in the non-volatile semiconductor memory area. Thereby, the non-volatile memory in need of deletion for data writing can be appropriately handled.

In one example, the controller further saves log data associated with write commands other than the first write command among the plurality of write commands which specify discontinuous addresses to the second non-volatile memory area simultaneously. Thereby, more efficient saving of log data is achieved. In another example, the log data associated with a single write command includes a prologue before update and an epilogue after update in the segment table in the volatile memory area, and the controller omits prologues associated with write commands other than the first command. Thereby, more efficient saving of log data is achieved. Log data associated with the plurality of write commands specifying discontinuous addresses may comprise a prologue and an epilogue of the first write command and epilogues of write commands other than the first write command and that the controller may save the prologue of the first write command and then saves other log data simultaneously. Thereby, if a power shutdown occurs before saving all log data, appropriate handling can be achieved.

Another aspect of embodiments of the present invention is a data management method in a data storage device comprising a disk memory area for storing user data and a non-volatile semiconductor memory area for storing user data. In an embodiment, the method stores a segment table in which the address in the disk memory area of user data stored in the non-volatile semiconductor memory area is registered to a volatile memory area. The method saves the segment table in a first non-volatile memory area. The method saves log data indicating update history of the segment table in the volatile memory area to a second non-volatile memory area. The method creates log data associated with a plurality of write commands to a continuous address area in the disk memory area while omitting a part of log data associated with each of the plurality of write commands. The method saves the created log data associated with the plurality of write commands to the second non-volatile memory area. Thereby, more efficient saving of log data is achieved.

Embodiments of the present invention accomplish efficient saving of log data indicating an update of a segment table.

Hereinafter, embodiments to which the present invention is applicable will be described. For clarity of explanation, the following descriptions and accompanying drawings may have omissions and simplifications as appropriate. Throughout the drawings, like components are denoted by like reference numerals and repetitive descriptions are omitted if not necessary. Hereinbelow, hard disk drives (HDDs) will be described as an example of disk drive devices.

An HDD according to one embodiment is equipped with a flash memory in addition to a magnetic disk as non-volatile memories for storing user data. The flash memory is a non-volatile semiconductor memory. To manage user data to be saved in the flash memory, the HDD creates a table to register the address (LBA) on the magnetic disk of the user data stored in the flash memory. The table will be referred to as a segment table hereinafter.

The HDD of one embodiment updates the segment table in a RAM and saves it to the flash memory at a specific timing. The HDD of the present embodiment further creates log data indicating an update in the RAM and saves them to the flash memory. The log data will be referred to as a journal hereinafter. When an accident such as an unexpected power shutdown occurs, the HDD restores the latest segment table using the segment table and the journals in the flash memory.

The HDD of one embodiment has a feature in a method for saving journals which are log data. The HDD of the present embodiment saves journals associated with a single write command or journals associated with a group of write commands according to conditions. In saving journals associated with a group of write commands, the HDD omits a part of the journals associated with the write commands in the group. Accordingly, the number of journals associated with a group is less than the total number of the journals associated with the write commands in the group. Thus, the number of entries in the journals indicating an update of the segment table can be reduced and the process time to register the journals into the table can be shortened.

In the present embodiment, examples of the method to make a group of write commands will be explained. One method makes a group with a plurality of write commands to a continuous area of a magnetic disk. The HDD regards a plurality of write commands specifying a continuous address area on the magnetic disk as a group and saves the journals associated with the group to a table.

The other method makes a group with a plurality of write commands specifying discrete and discontinuous areas on the magnetic disk. The journals to be saved in association with each of these two different groups are different. In this way, saving different journals depending on whether the group of write commands specifies a continuous area or to discontinuous areas accomplishes more efficient processing while saving necessary information to restore the segment table.

Figure 1:
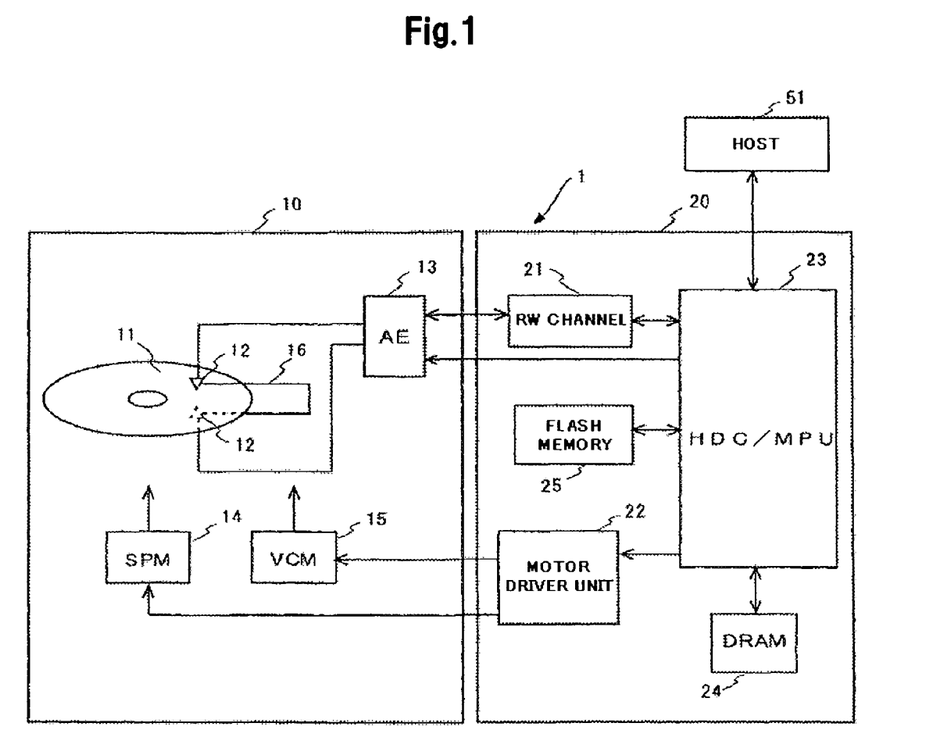
FIG. 1 is a block diagram schematically depicting an entire configuration of a hard disk drive according to one embodiment.

First, a configuration of an HDD according to one embodiment will be outlined referring to the block diagram of FIG. 1. The HDD 1 comprises a circuit board 20 fixed outside an enclosure 10. On the circuit board 20, circuits such as a read-write channel (RW channel) 21, a motor driver unit 22, an integrated circuit (HDC/MPU) 23 of a hard disk controller (HDC) and an MPU, and a DRAM 24 of a volatile semiconductor memory, a flash memory 25 of a non-volatile semiconductor memory, and the like are mounted. In the enclosure 10, a spindle motor (SPM) 14 spins a magnetic disk 11 at a specific angular rate. The magnetic disk 11 is a disk for storing data and a non-volatile memory.

Head sliders 12 each comprises a slider flying over the magnetic disk and a head element portion fixed to the slider for converting magnetic signals to and from electric signals (writing and reading data). Each head slider 12 is fixed at the tip end of an actuator 16. The actuator 16, which is coupled to a voice coil motor (VCM) 15, pivots about a pivotal shaft to move the head slider 12 above the spinning magnetic disk 11 in its radial direction. The motor driver unit 22 drives the SPM 14 and the VCM 15 according to control data from the HDC/MPU 23. An arm electronics (AE) 13 selects a head slider 12 to access (read or write) the magnetic disk 11 from multiple head sliders 12 according to control data from the HDC/MPU 23 and amplifies read/write signals.

The RW channel 21, in a read operation, extracts servo data and user data from read signals obtained from the AE 13 to decode them. The decoded data are supplied to the HDC/MPU 23. In a write operation, the RW channel 21 code-modulates write data supplied from the HDC/MPU 23 and further converts the code-demodulated data into write signals to supply them to the AE 13.

In the HDC/MPU 23, the HDC is a logic circuit and the MPU operates according to firmware loaded in the DRAM 24. With start-up of the HDD 1, data required for control and data processing are loaded into the DRAM 24 from the magnetic disk 11 or a ROM (not shown). The HDC/MPU 23 is an example of a controller and performs entire control of the HDD 1 as well as processes required for data processing such as head positioning control, interface control, and defect management, and the like.

The HDC/MPU 23 saves a part of user data from a host 51 to a flash memory 25. Namely, the HDC/MPU 23 saves user data to the flash memory 25 in response to a write command of a write-out operation to the flash memory 25 among the write commands received from the host 51. Whether or not to save the user data in the flash memory 25 to the magnetic disk 11 as well can be decided depending on design. Data to be saved to the flash memory 25 can be identified by the LBA on the magnetic disk 11. When the HDC/MPU 23 receives a write command to the predetermined LBA, it saves the user data to the flash memory 25. The HDC/MPU 23 can decide the LBA of the user data to be saved to the flash memory 25 by itself and also saves the user data at the LBA specified by the host 51 to the flash memory 25.

Figure 2:
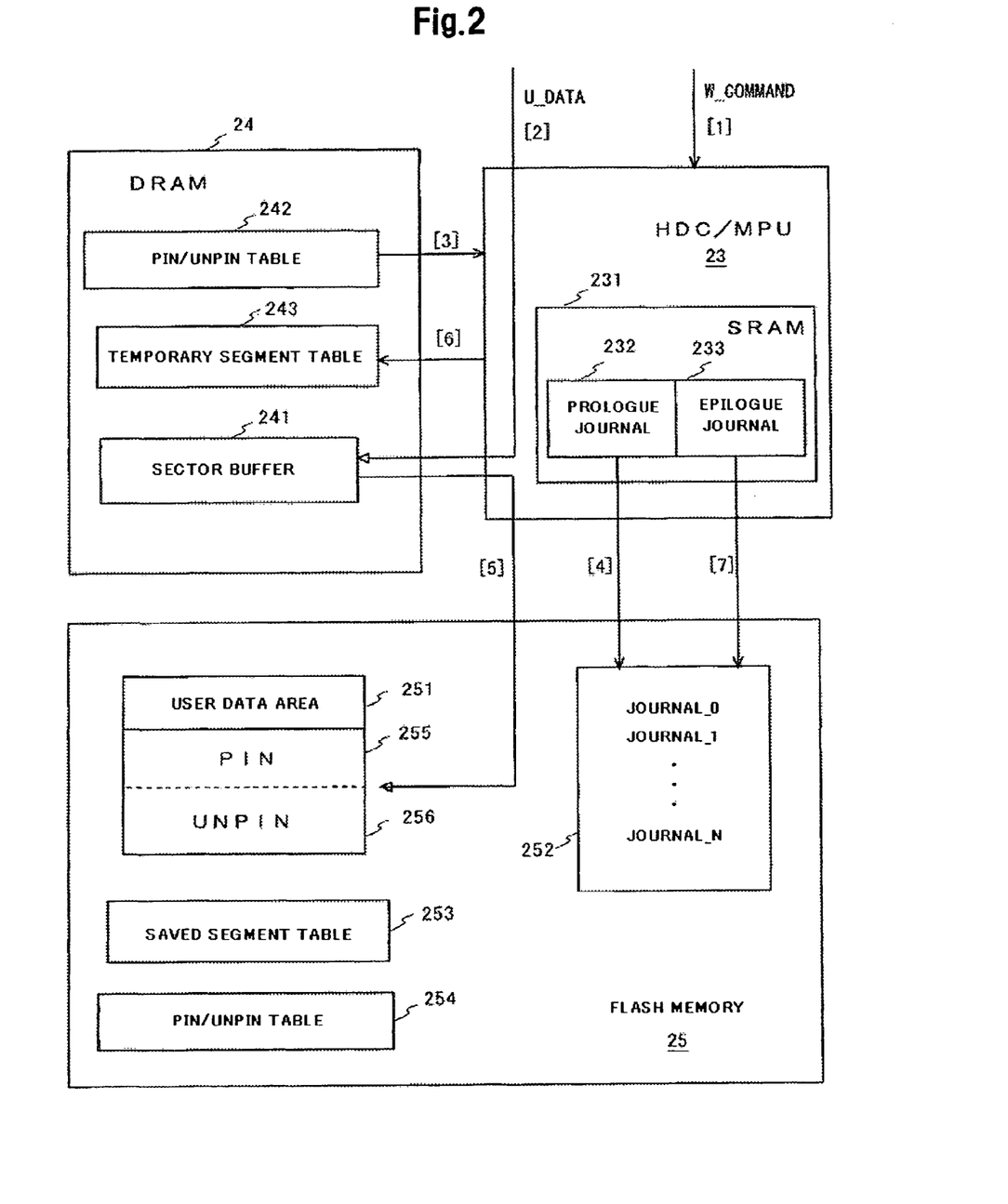
FIG. 2 is a block diagram schematically depicting components for reproduction in one embodiment.

FIG. 2 is a block diagram schematically illustrating logic components relating to operation for saving user data to the flash memory 25. A PIN/UNPIN table 242 in the DRAM 24 indicates a magnetic address area for the data to be saved to the flash memory 25. The PIN area and the UNPIN area are areas for a part of magnetic disk addresses indicated by LBAs. The PIN area is the area that the host 51 specifies as an address area to be saved to the flash memory 25. The UNPIN area is the area that the HDC/MPU 23 itself selects as an address area to be saved to the flash memory 25.

The HDC/MPU 23 loads the PIN/UNPIN table 254 saved in the flash memory 25 into the DRAM 24. The HDC/MPU 23 performs processes referring to the PIN/UNPIN table 242 in the DRAM 24 in a write operation. If the HDC/MPU 23 changes the PIN/UNPIN table 242 in the DRAM 24, it reflects the change into the PIN/UNPIN table 254 in the flash memory 25.

Specific user data U_DATA transferred from the host 51 are stored into a sector buffer in the DRAM 24 and then are saved to the flash memory 25. A user data area 251 has been allocated in the flash memory 25 and user data are saved there. As described above, data to be saved to the flash memory 25 are PIN data and UNPIN data which are saved in a PIN area 255 and an UNPIN area 256 in the user data area 251, respectively.

The HDC/MPU 23 loads the saved segment table 253 in the flash memory 25 into the DRAM 24. A temporary segment table 243 which is a segment table in the DRAM 24 is referred by the HDC/MPU 23 in read and write operations of user data. The segment tables 243 and 253 locate the addresses for the user data saved in the flash memory 25. Specifically, the segment tables 243 and 253 associate flash memory addresses of the user data in the flash memory 25 with magnetic disk addresses. The host 51 instructs a data write specifying the LBA, which is an address on the magnetic disk 11. The segment tables 243 and 253 store the LBA and the address in the flash memory 25 correlating them.

Figure 3:
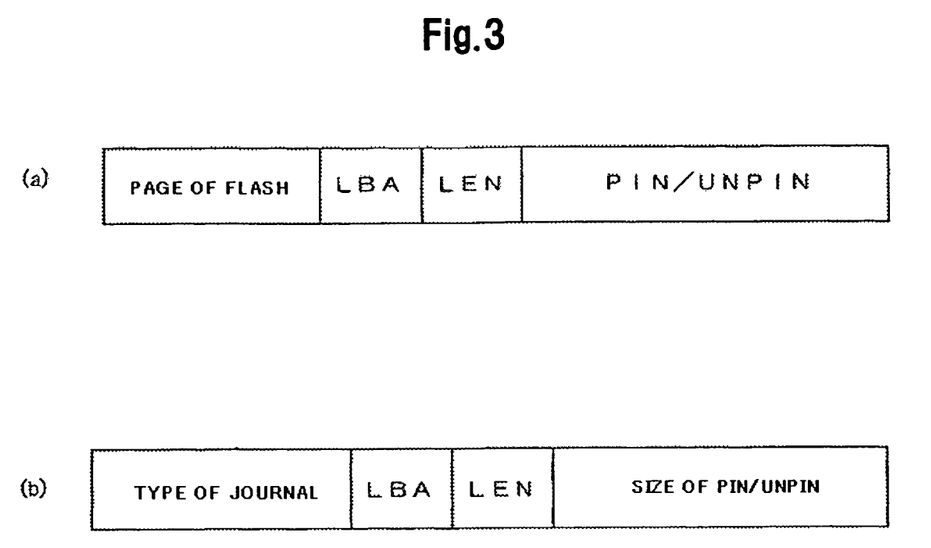
FIGS. 3(a) and 3(b) are drawings schematically illustrating formats of a record in a segment table and a journal according to one embodiment.

FIG. 3(a) schematically illustrates a format of a record in the segment tables 243 and 253. A record comprises a page of the flash memory 25, a start LBA of the user data saved in the flash memory 25, a data length LEN expressed by the number of data sectors, and an identification of PIN/UNPIN.

The HDC/MPU 23 updates the temporary segment table 243 in response to an access (write) to the flash memory 25. The HDC/MPU 23 does not immediately reflect the updated contents to the segment data table 253 in the flash memory 25, but creates a journal, which is log data indicating the updated contents. The HDC/MPU 23 includes an SRAM 231 and stores the created journal in the SRAM 231. The created journal is saved to an area 252 in the flash memory 25. Use of the SRAM 231 for storing the journal before saving speeds up the process than use of a DRAM. Saving the journals from the SRAM 231 into the flash memory 25 can be carried out faster than from a DRAM, too.

FIG. 3(b) schematically illustrates a format of a journal. A journal comprises data indicating the type of the journal, a start LBA, a data length LEN, and the size of a PIN/UNPIN. The LBA and the LEN are the same as the data in a record in the segment tables 243 and 253. The size of the PIN/UNPIN indicates the size of the PIN area 255 or UNPIN area 256 in the user data area 251. The segment table has stored the starting page of use and the PIN area 255 or the UNPIN area 256 stores user data sequentially from the respective starting page of use so that specifying the size of the PIN/UNPIN allows to locate the data in the PIN area 255 or the UNPIN area 256. There are plural types of journals; the present specification will explain a prologue journal and an epilogue journal. The HDC/MPU 23 updates a temporary segment table 243 after creating a prologue journal 232, and then creates an epilogue journal 233. This enables accurate restoration of the segment table even if an accident such as a power shutdown occurs during updating the temporary segment table 243.

Now referring to FIG. 2, an example of saving user data to the flash memory 25 and the accompanying update of the temporary segment table 243 and saving journals will be explained. In the following example, the HDC/MPU 23 saves journals associated with a single write command. The HDC/MPU 23 receives a write command W_COMMAND from the host 51 [1]. Then, the HDC/MPU 23 receives user data U_DATA and stores them in a sector buffer 241 [2]. The HDC/MPU 23 refers to the PIN/UNPIN table 242 in the DRAM 24 to determine whether or not the LBA specified by the write command W_COMMAND is present in the PIN or UNPIN area [3]. In the present example, it is assumed that the specified LBA is present in either of the areas.

The HDC/MPU 23 creates a prologue journal 232 and saves it to a journal area 252 in the flash memory 25 [4]. Next, the HDC/MPU 23 saves the user data U_DATA in the sector buffer 241 to a user data area 251 in the flash memory 25 [5]. Then, the HDC/MPU 23 updates a temporary segment table 243 [6]. Finally, the HDC/MPU 23 creates an epilogue journal 233 and saves it to the journal area 252 in the flash memory 25 [7].

Figure 4:
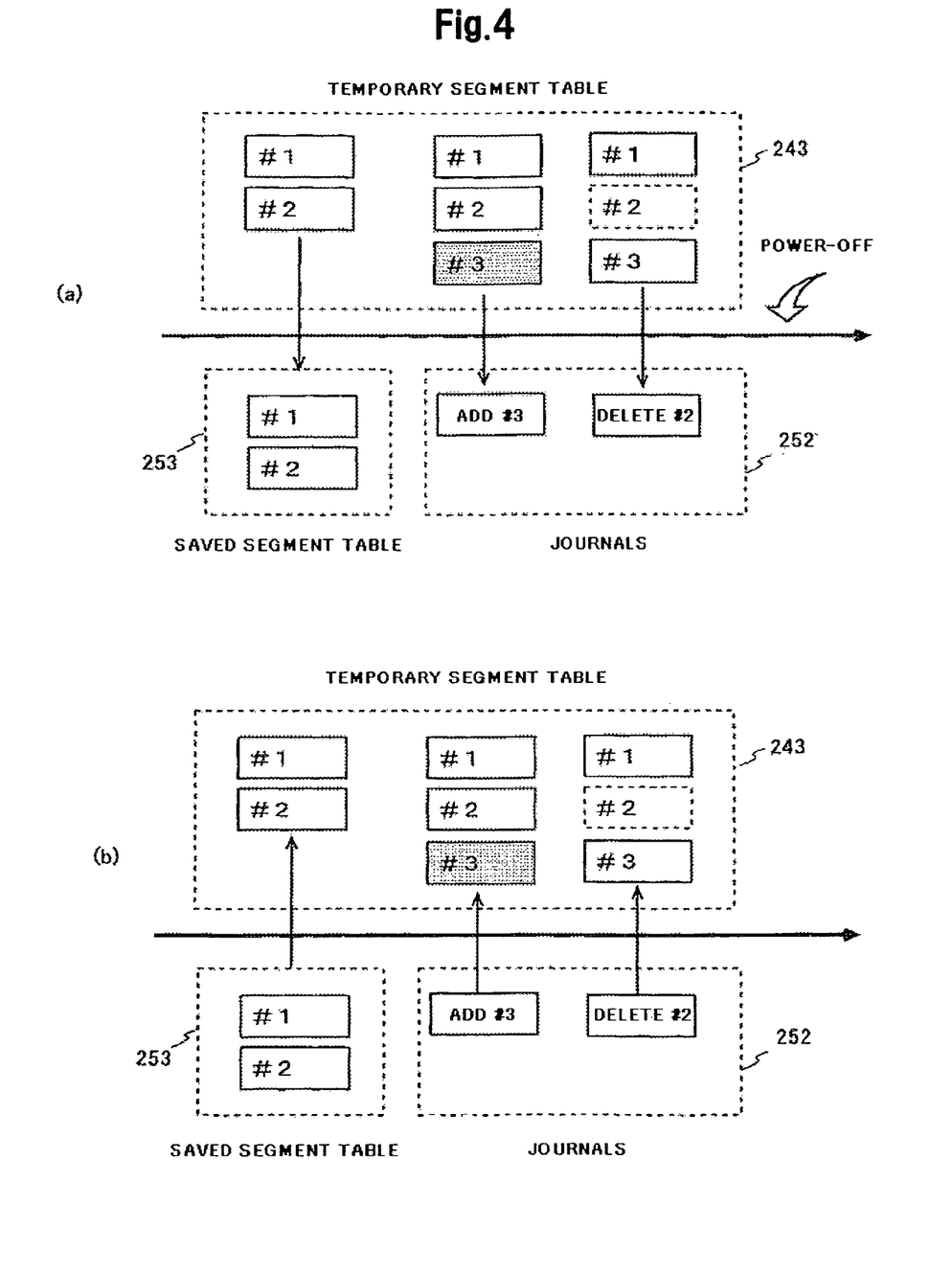
FIGS. 4(a) and 4(b) are drawings schematically illustrating an example of restoration of a segment table using journals according to one embodiment.

Next, an example of restoration of the segment table using journals after an accidental power shutdown will be described referring to FIGS. 4(a) and 4(b). In FIG. 4(a), the arrow directing from the left to the right represents the elapsed time. The following processes are performed by the HDC/MPU 23. The first process saves records #1 and #2 stored in the temporary segment table 243 to the saved segment table 253. The next process adds a record #3 to the temporary segment table 243 and saves a journal indicating the addition to the journal area 252. The next process deletes the record #2 from the temporary segment table 243 and saves a journal indicating the deletion to the journal area 252. At this stage, a power shutdown arises.

Upon recovery of the power, a restoration process shown in FIG. 4(b) starts. The first process in FIG. 4(b) loads the records #1 and #2 in the saved segment table into the DRAM 24 to create a temporary segment table 243. The next process adds the record #3 to the temporary segment table 243 according to the journal indicating the addition of the record #3. The last process deletes the record #2 from the temporary segment table 243 according to the journal indicating the deletion of the record #2. This process completes the restoration of the temporary segment table 243. If necessary, the temporary segment table 243 may be saved at this timing. The HDC/MPU 23 saves the temporary segment table 243 to the flash memory 25 to update the saved segment table 253, and clears the journal area 252.

Saving journals in the above-described manner reduces the operating time than saving the segment table every time and enables the segment table to be restored even if an accident such as an unexpected power shutdown has occurred. In particular, a flash memory requires a write of new data after a deletion of data in a unit of block to rewrite data. Namely, to update the saved segment table 253, the flash memory 25 deletes the block including the area storing the table and then writes a new saved segment table 253 to the deleted block.

Generally, the saved segment table has a binary tree data structure, a linear list, or a hash table for high-speed search; it requires an entire rewrite even in adding a part of data. On the other hand, the flash memory 25 writes new journals into its journal area 252 as needed. This write operation does not require a delete operation so that the operating time is extremely shortened.

It is, however, possible to reserve journals without saving the updated segment table to the flash memory 25 to reduce the process time of updating the segment table, but the journal area 252 in the flash memory 25 to store journals is limited. Besides, even if deletion is not needed to save journals, process time to write journals is needed. Then, the HDC/MPU 23 of the present embodiment regards a plurality of write commands as a group to save the journals associated with the group to the journal area 252 in the flash memory 25. This improves the efficiency in saving journals and reduces the number of entries in the journals to be saved and the process time of saving.

Figure 5:
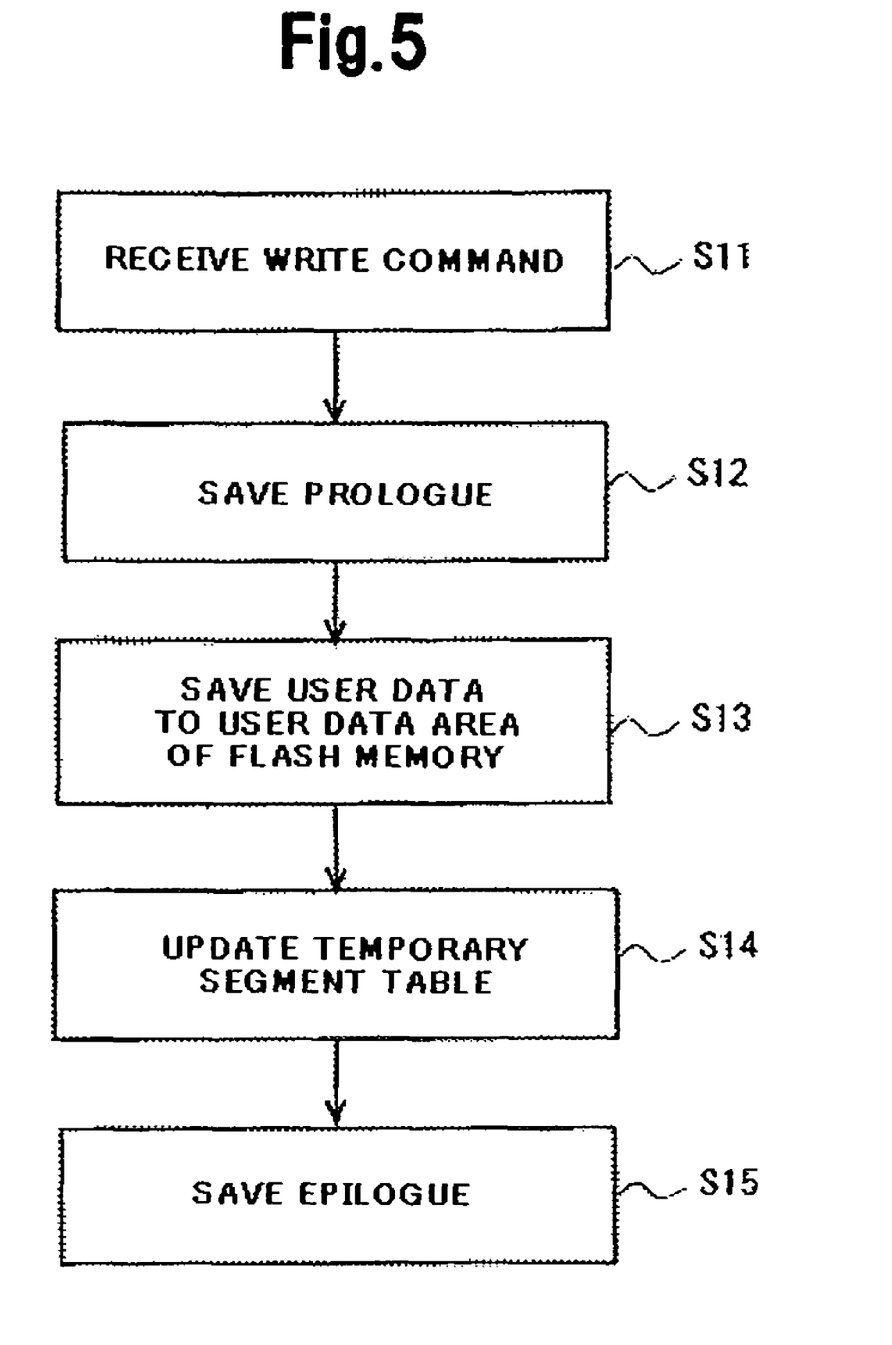
FIG. 5 is a flowchart illustrating an example of saving journals in every write command in one embodiment.
Figure 6:
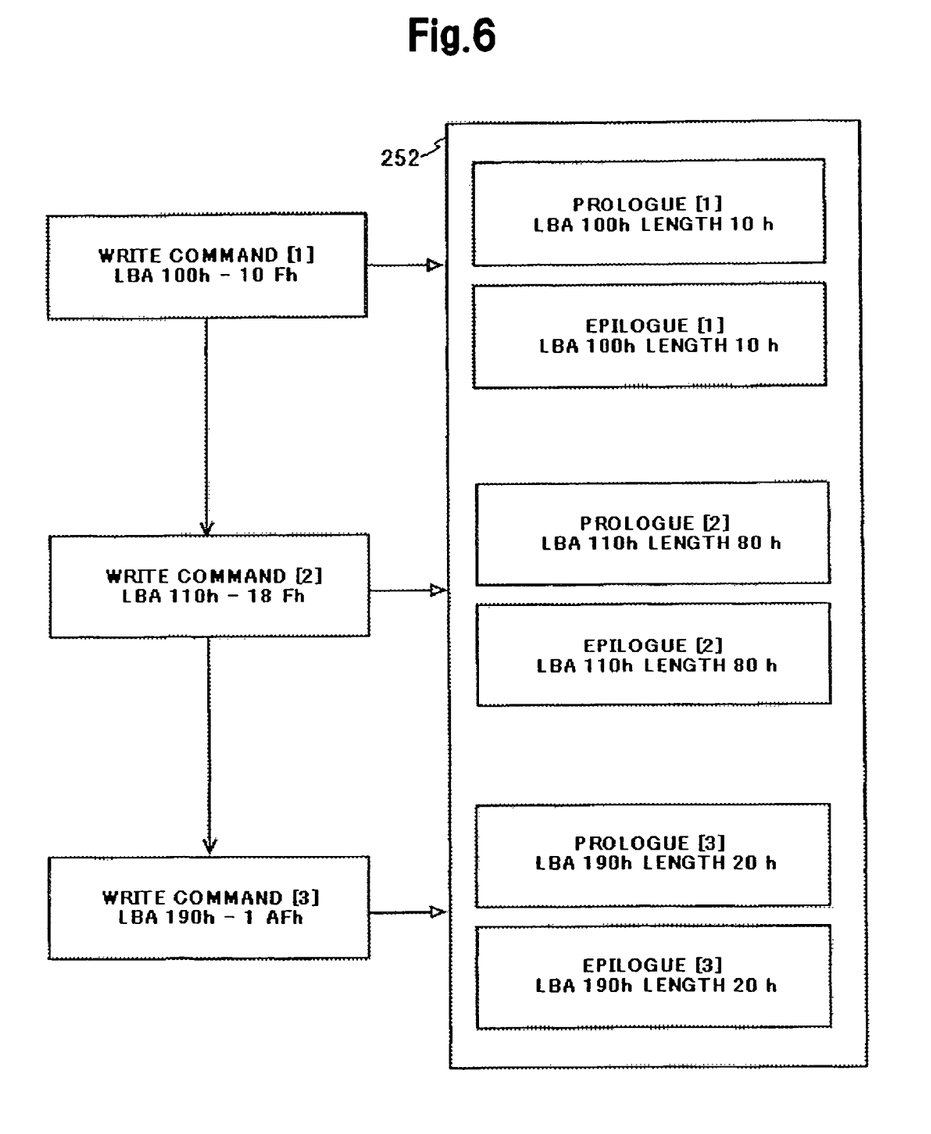
FIG. 6 is a drawing illustrating an example of saving journals in every write command in one embodiment.

First, referring to the flowchart of FIG. 5 and the block diagram of FIG. 6, an example of saving journals for each of three write commands will be described. When the HDC/MPU 23 receives a write command [1] (S11), it saves a prologue [1] to the journal area 252 (S12). The address specified by the write command [1] is LBA 100h to 10Fh. The prologue [1] indicates the start LBA 100h and the data length 10h. Next, the HDC/MPU 23 saves the user data received together with the write command to the flash memory 25 (S13) and further updates the temporary segment table 243 in the DRAM 24 (S14). Finally, the HDC/MPU 23 saves an epilogue [1] associated with the write command [1] to the journal area 252 (S15). The epilogue [1] indicates the start LBA 100h and the data length 10h.

The HDC/MPU 23 repeats the same process with respect to a write command [2] and a write command [3]. Accordingly, as shown in FIG. 6, the journals saved in the journal area 252 have six entries of the prologue [1] to the prologue [3] and the epilogue [1] to the epilogue [3]. To save the journals associated with the three write command [1] to the write command [3], the HDC/MPU 23 performs six write operations.

Next, the saving of journals associated with a group made of three write commands [1] to [3] will be described. The addresses specified by the three write commands [1] to [3] are a continuous address area (LBA 100h to 1AFh) on the magnetic disk 11. The HDC/MPU 23 groups together such a plurality of write commands to a continuous address area and saves the journals associated with the group which is made of a plurality of write commands.

Figure 7:
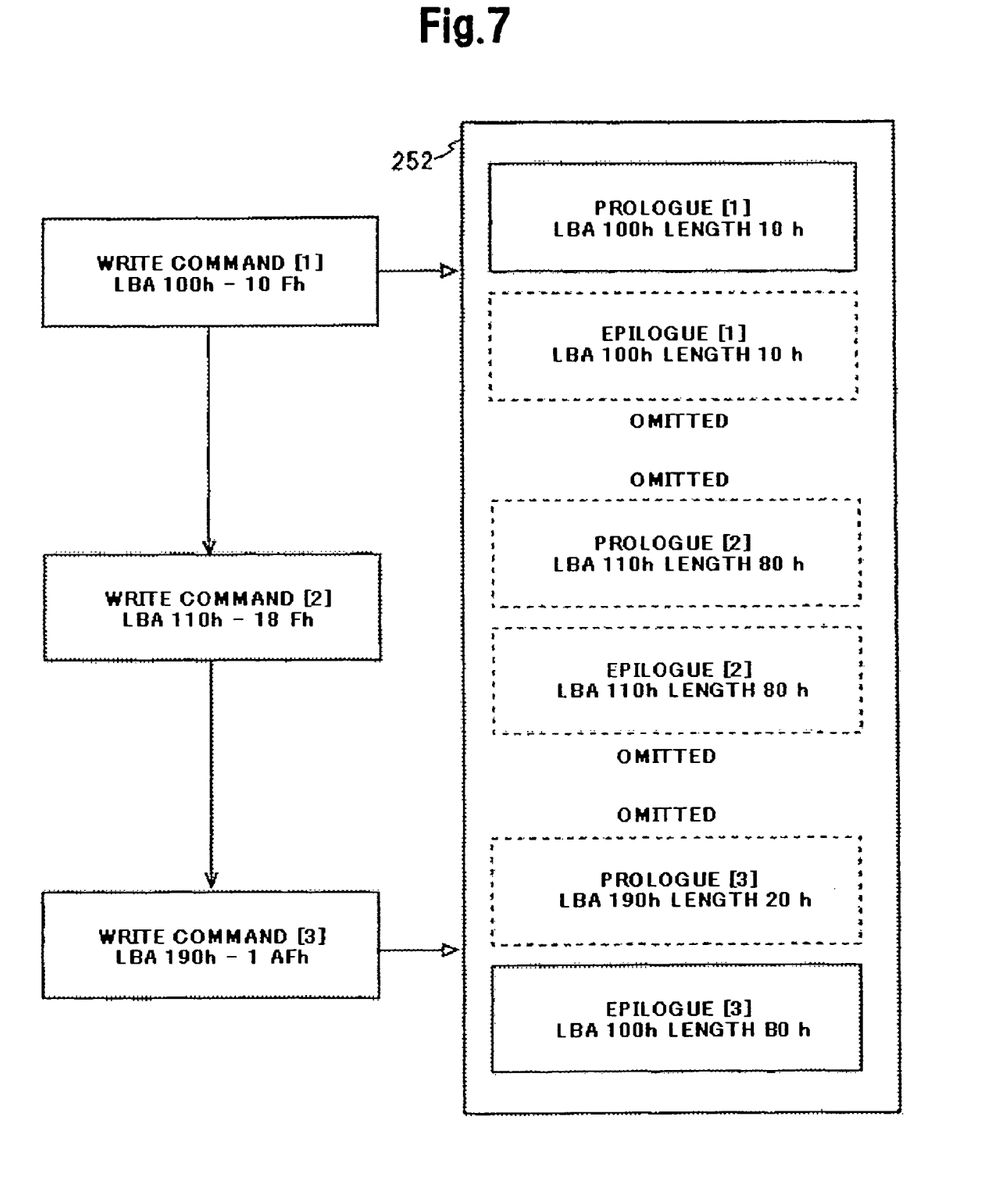
FIG. 7 is a drawing illustrating an example of saving journals associated with a group made of a plurality of write commands specifying a continuous area in one embodiment.

FIG. 7 illustrates write commands [1] to [3] and journals to be saved in association with them. The journals to be saved are only two entries of a prologue [1] and an epilogue [3]. Compared with the case described with reference to FIG. 6 where journals are saved at every write command, all journals associated with the middle write command [2], the epilogue [1] of the first write command [1], and the prologue [3] of the last write command [3] are omitted. In this way, the update of the segment table 243 according to a plurality of write commands to write a continuous area can be indicated by the prologue of the first write command and the epilogue of the last write command.

Since the address area specified by the plurality of write commands is continuous, the area can be indicated by journals associated with a single write command. The important matter is that the data included in the epilogue [3] associated with the last write command [3] are different from the one in the journal which is created only for the write command [3]. As illustrated in FIG. 6, when journals are saved in the independent write command [3], the epilogue also contains the address specified by the write command [3].

When journals are saved for grouped plurality of write commands, however, the epilogue is required to indicate the all address areas specified by the plurality of write commands. Accordingly, the HDC/MPU 23 determines the start LBA and the data length from the start LBA of the prologue [1] of the first write command [1] and the end LBA of the last write command [3] and stores the value to the epilogue [3]. In the example of FIG. 7, the start LBA of the epilogue [3] is LBA 100h which is the same as the prologue [1] and the data length is B0h from LBA 100h to the end address 1AFh of the last write command [3].

Making a unit with a plurality of write commands specifying a continuous area and saving the journals thereof can reduce the number of entries of journals to be saved and the process time for saving the journals. As understood from the above explanation, the HDC/MPU 23 performs only two write operations to save the journals of three write commands. Compared with saving journals of respective write commands independently, the process time of four write operations can be reduced.

Figure 8:
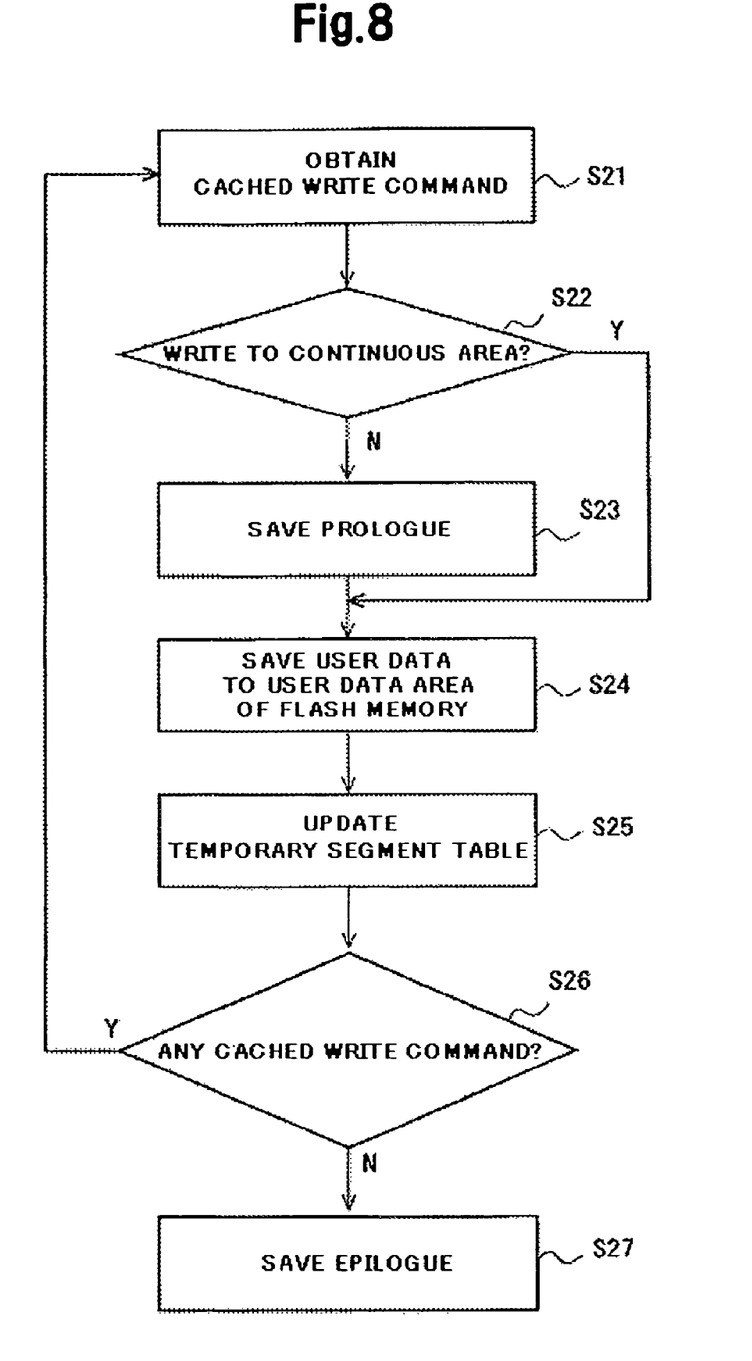
FIG. 8 is a flowchart illustrating an example of saving journals associated with a group made of a plurality of write commands specifying a continuous area in one embodiment.

Next, referring to the flowchart of FIG. 8, saving journals as a group, which is made of the above three write commands, will be described. The write cache function of the HDD 1 is enabled. The write cache function is a function to notify a write command from the host 51 of a completion when the write data has been stored in the sector buffer 241 before saving the write data to a non-volatile memory. If the write cache function is enabled, the saving of the write data is not assured to the host 51.

The HDC/MPU 23 obtains a cached write command (S21), refers to the address specified by the write command, and determines whether the specified address is continuous with the address of the preceding write command (S22). Since the first write command [1] is not a command to write the continuous area (N in S22), the HDC/MPU 23 writes a prologue [1] in the journal area 252 (S23). The HDC/MPU 23 further saves the user data of the write command [1] to the flash memory 25 (S25) and updates the temporary segment table 243 in the DRAM 24 (S25).

Next, the HDC/MPU 23 checks whether a subsequent write command has been cached or not (S26), and if the subsequent write command is present (Y in S26), it obtains the write command (S21). In the present example, the HDC/MPU 23 obtains a write command [2]. The HDC/MPU 23 refers to the address specified by the write command [2] and determines whether the address is continuous with the address specified by the preceding write command [1] (S22). In the present example, these specified addresses are a continuous area (Y in S22), so that the HDC/MPU 23 omits a write operation of a prologue (S23) to save the user data of the write command [2] to the flash memory 25 (S24), and updates the temporary segment table 243 in the DRAM 24 (S25).

Then, the HDC/MPU 23 checks whether another subsequent write command has been cached or not (S26), and if the subsequent write command is present (Y in S26), it obtains the write command (S21). In the present example, the HDC/MPU 23 obtains a write command [3]. The HDC/MPU 23 refers to the address specified by the write command [3] and determines whether the address is continuous with the address specified by the preceding write command [2] (S22). In the present example, these specified addresses are a continuous area (Y in S22).

Accordingly, the HDC/MPU 23 omits a write operation of a prologue (S23) to save the user data of the write command [3] to the flash memory 25 (S24), and further updates the temporary segment table 243 in the DRAM 24 (S25). If no cached command is present (N in S26), the HDC/MPU 23 saves an epilogue (S27). In the present example, the write command [3] is the last write command and the HDC/MPU 23 writes the epilogue [3] shown in FIG. 7 to the journal area 252.

According to the present embodiment of a method, if two write commands specify a continuous address area, the HDC/MPU 23 omits the epilogue associated with the first write command and the prologue associated with the last write command. Besides, if three or more succeeding write commands specify a continuous address area, the HDC/MPU 23 omits to save the epilogue associated with the first write command, the prologue associated with the last write command, and all of the journals associated with the intermediate write command or commands.

The HDC/MPU 23 can include all of the write commands to write a continuous area within a single group. Namely, if the address area specified by the obtained write command is continuous with the address area of the preceding write command, the HDC/MPU 23 unconditionally includes the write command into the group. However, including the command into the group may delay saving of journals and too long process time in saving may sometimes be undesirable.

Then, in one example, when the number of the write commands constituting a group reaches a preset threshold, the HDC/MPU 23 saves the journals associated with the group to the flash memory 25, or when the address area specified by the write commands constituting a group reaches a preset threshold, the HDC/MPU 23 saves the journals associated with the group to the flash memory 25.

The HDC/MPU 23 may determine whether or not to include a write command within a group depending on the address area specified by each write command. Specifically, when the length of the address specified by write commands has already reached a preset threshold, the HDC/MPU 23 saves the journals of the independent write command, or the prologue and epilogue associated with the write command, to the flash memory 25.

If the prologue and the epilogue associated with a group have been saved in the flash memory 25, the HDC/MPU 23 can restore the segment table using the prologue and the epilogue after an accidental power shutdown. The power shutdown, however, may occur after saving the prologue and before saving the epilogue. If the epilogue has not been saved, the HDC/MPU 23 cannot know the write data length of the group which has been stored in the user data area 251 of the flash memory 25. On the other hand, the HDC/MPU 23 cannot overwrite data in the flash memory 25 and needs to delete existing data.

Then, if a power shutdown occurs before the epilogue associated with the group is saved, the HDC/MPU 23 deletes the area in the user data area 251 where the user data associated with the group may have been saved. Specifically, the HDC/MPU 23 deletes the non-use area following the address in the user data area 251 which the prologue of the group indicates. The non-use area is the area up to the area where the saved segment table 253 indicates that other user data has been saved. If the user data area 251 functions as a ring buffer, the area other than the area where other user data have been saved is deleted. This accomplishes succeeding smooth saving operations of the user data to the user data area 251.

Figure 9:
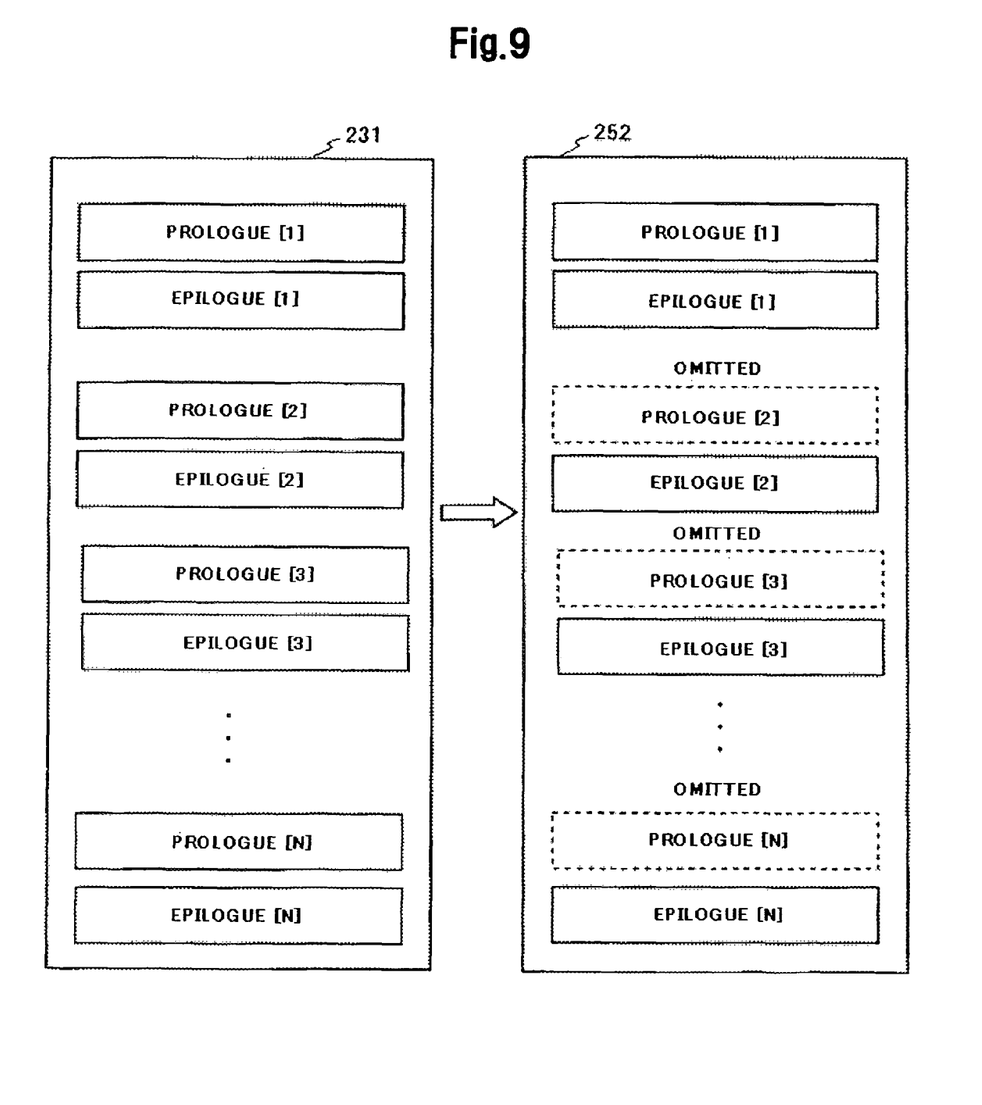
FIG. 9 is a drawing illustrating an example of saving journals associated with a group made of a plurality of write commands specifying discrete areas in one embodiment.

Next, another embodiment of a method of grouping write commands will be described. This method regards a plurality of write commands specifying discontinuous (discrete) address areas as a group, and saves a part of the journals of the group to the flash memory 25 simultaneously. The HDC/MPU 23 omits a part of the journals to save them. Referring to FIG. 9, a detailed description will be given.

The write cache function has been enabled. In the process of a cached write command [1], the HDC/MPU 23 stores the prologue [1] and the epilogue [1] in the SRAM 231. Moreover, the HDC/MPU 23 saves the prologue [1] to the journal area 252 in the flash memory 25. Then, the HDC/MPU 23 processes the cached write command [2] through write command [N] sequentially and stores the prologue [2] through prologue [N] and the epilogue [2] through epilogue [N] associated with the respective write commands into the SRAM 231.

When cached write commands end or when the number of journals stored in the SRAM 231 reaches a threshold, the HDC/MPU 23 saves the journals stored in the SRAM 213 to the journal area 252 in the flash memory 25 simultaneously. On this occasion, the HDC/MPU 23 omits the prologue [2] to prologue [N] of the write commands and saves the epilogue [2] to epilogue [N] to the journal area 252. Only epilogues are necessary enough to update the saved segment table 253, so that the HDC/MPU 23 can reduce the number of entries by omitting journals to be saved. Besides, simultaneous saving of the journals associated with a plurality of write commands can reduce the process time thereof. The process when a power shutdown occurs after saving only the first prologue and before saving the following journals is the same as the one in the above-described case where write commands to a continuous area constitute a group.

As set forth above, the present invention has been described by way of particular embodiments, but is not limited to the above embodiments and can of course be modified in various ways within the scope of the substance of the present invention. For example, in one embodiment, a HDD has been described by way of example but embodiments of the present invention can be applied to disk storage devices using other types of disks such as optical disks and magneto-optical disks.

As described above, the segment table may be saved to a non-volatile semiconductor memory, but may also be saved to a magnetic disk of a non-volatile memory. As the non-volatile semiconductor memory, a memory other than the flash memory may be used. Alternately, a non-volatile semiconductor memory area may be created by use of a plurality of ICs. The memory area is not limited by the number of elements such as ICs and disks. The data format of the segment table and the journals and the number of log data associated with a single write command may be changed depending on design.

What is claimed is:

1. A data storage device comprising:
a disk memory area configured to store user data;
a non-volatile semiconductor memory area configured to store user data;
a volatile memory area configured to store a segment table in which an address in the disk memory area of user data stored in the non-volatile semiconductor memory area is registered;
a first non-volatile memory area in which the segment table is saved;
a second non-volatile memory area in which log data indicating update history of the segment table in the volatile memory area is saved; and
a controller configured to create log data associated with a plurality of write commands to a continuous address area in the disk memory area while omitting a part of log data associated with each of the plurality of write commands, and, for saving the created log data associated with the plurality of write commands to the second non-volatile memory area.

2. The data storage device according to claim 1, wherein the first non-volatile memory area, the second non-volatile memory area, and the non-volatile semiconductor memory area are provided in a same non-volatile semiconductor memory.

3. The data storage device according to claim 1, wherein if the plurality of write commands are three or more write commands, the controller is configured to omit log data of all the write commands between a first write command and a last write command.

4. The data storage device according to claim 1, wherein log data associated with a single write command includes a prologue before update and an epilogue after update in the segment table in the volatile memory area; and
the controller saves a prologue of the first write command and an epilogue of the last write command to the second non-volatile memory area and omits log data between the prologue of a first write command and the epilogue of a last write command.

5. The data storage device according to claim 4, wherein a prologue and an epilogue associated with the single write command each include a start address and an address length specified by the single write command; and
the epilogue of the last write command includes a start address included in the prologue of the first write command.

6. The data storage device according to claim 1, wherein the controller is configured to process write commands in the order that the write commands were cached, and if an address specified by a current write command is continuous with an address specified by a preceding write command, the controller is configured to add the current write command to the plurality of write commands.

7. The data storage device according to claim 6, wherein if the number of write commands constituting the plurality of write commands has reached a threshold, the controller is configured to save current log data associated with the plurality of write commands to the second non-volatile memory area.

8. The data storage device according to claim 6, wherein if a length of an address specified by a particular write command has reached a threshold, the controller saves log data associated with the particular write command to the second non-volatile memory area independently.

9. The data storage device according to claim 6, wherein if an address area specified by a write command comprising the plurality of write commands has reached a threshold, the controller is configured to save current log data associated with the plurality of write commands to the second non-volatile memory area.

10. The data storage device according to claim 1, wherein if a power shutdown interrupts saving log data associated with the plurality of write commands, the controller started-up after the power shutdown is configured to delete a non-use area following an address associated with the first write command of the plurality of write commands in the non-volatile semiconductor memory area.

11. The data storage device according to claim 1, wherein the controller is further configured to save log data associated with write commands other than a first write command among the plurality of write commands which specify discontinuous addresses to the second non-volatile memory area simultaneously.

12. The data storage device according to claim 11, wherein log data associated with a single write command includes a prologue before update and an epilogue after update in the segment table in the volatile memory area; and
the controller is configured to omit prologues associated with write commands other than the first write command.

13. The data storage device according to claim 12, wherein log data associated with the plurality of write commands specifying discontinuous addresses comprises a prologue and an epilogue of the first write command and epilogues of write commands other than the first write command; and
the controller is configured to save the prologue of the first write command and then to save other log data simultaneously.

14. A data management method in a data storage device comprising a disk memory area for storing user data and a non-volatile semiconductor memory area for storing user data, the method comprising:
storing a segment table in which an address in the disk memory area of user data stored in the non-volatile semiconductor memory area is registered, to a volatile memory area;
saving the segment table in a first non-volatile memory area;
saving log data indicating update history of the segment table in the volatile memory area to a second non-volatile memory area;
creating log data associated with a plurality of write commands to a continuous address area in the disk memory area while omitting a part of log data associated with each of the plurality of write commands; and
saving the created log data associated with the plurality of write commands to the second non-volatile memory area.

15. The method according to claim 14 wherein if the plurality of write commands are three or more write commands, log data of all the write commands between a first write command and a last write command are omitted.

16. The method according to claim 14 further comprising simultaneously saving log data associated with write commands other than a first write command among the plurality of write commands which specify discontinuous addresses to the second non-volatile memory area.

* * * * *